Figure 1:
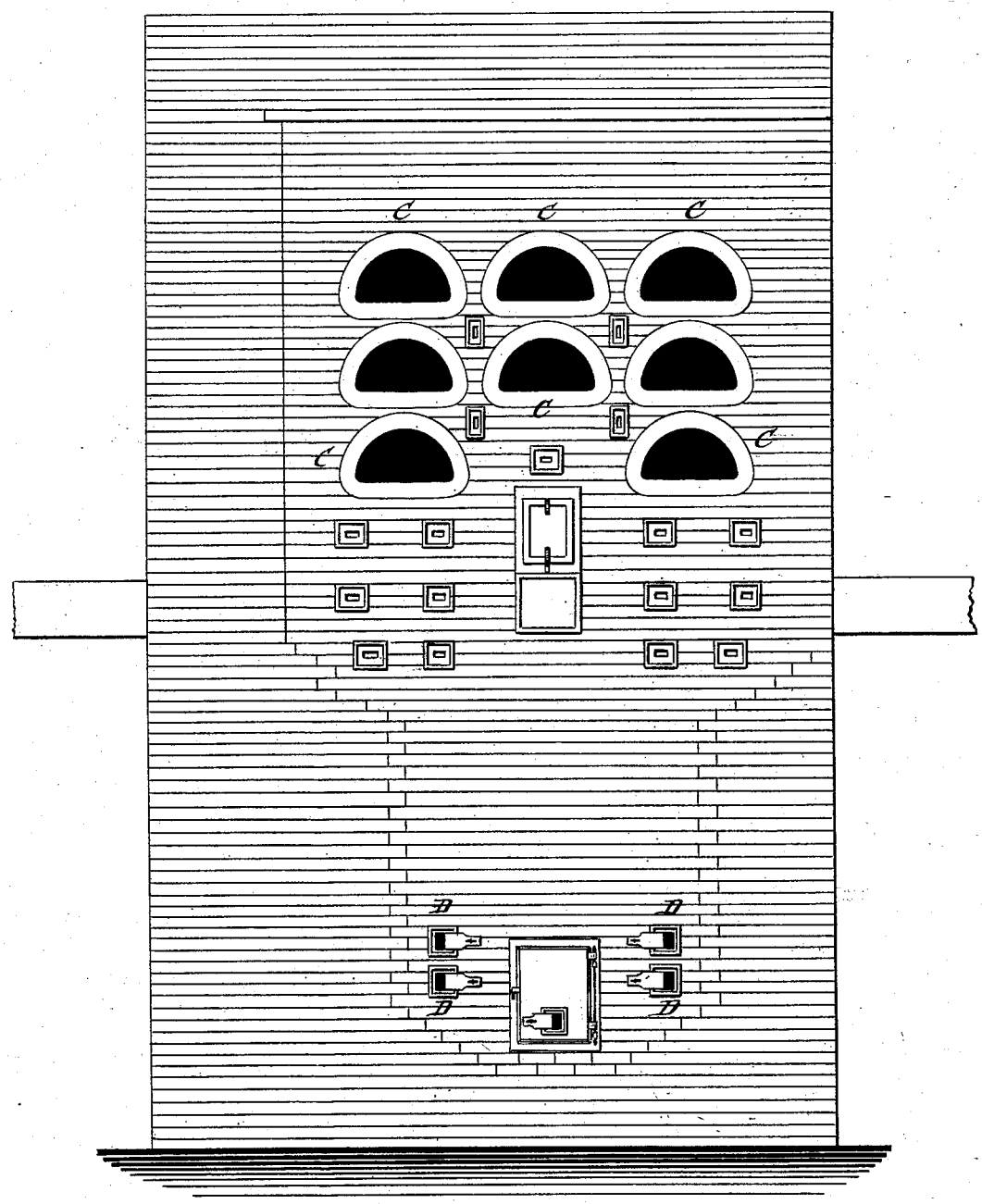

(No Model.) 6 Sheets—Sheet 2.

A. WEBER.
GAS GENERATING FURNACE FOR HEATING RETORTS.

No. 259,952. Patented June 20, 1882.

WITNESSES: INVENTOR
Adam Weber
BY Paul Goepel
ATTORNEY (No Model.) 6 Sheets—Sheet 3.

A. WEBER.
GAS GENERATING FURNACE FOR HEATING RETORTS.

No. 259,952. Patented June 20, 1882.

WITNESSES:

INVENTOR
Adam Weber
BY Paul Goepel
ATTORNEY (No Model.) 6 Sheets—Sheet 4.

A. WEBER.
GAS GENERATING FURNACE FOR HEATING RETORTS.

No. 259,952. Patented June 20, 1882.

WITNESSES:

INVENTOR

Adam Weber
BY Paul Goepel.
ATTORNEY (No Model.)

6 Sheets—Sheet 5.

A. WEBER.
GAS GENERATING FURNACE FOR HEATING RETORTS.

No. 259,952.

Patented June 20, 1882.

WITNESSES:

INVENTOR
Adam Weber
BY Paul Goepel
ATTORNEY (No Model.)  A. WEBER.  6 Sheets—Sheet 6.
GAS GENERATING FURNACE FOR HEATING RETORTS.
No. 259,952.  Patented June 20, 1882.

UNITED STATES PATENT OFFICE.

ADAM WEBER, OF NEW YORK, N. Y.

GAS-GENERATING FURNACE FOR HEATING RETORTS.

SPECIFICATION forming part of Letters Patent No. 259,952, dated June 20, 1882.

Application filed March 24, 1882. (No model.)

*To all whom it may concern:*

Be it known that I, ADAM WEBER, of the city, county, and State of New York, have invented certain new and useful Improvements in Gas-Generating Furnaces for Heating Retorts, of which the following is a specification.

In furnaces for heating gas-generating retorts it has been customary to use a separate generating-furnace in which the fuel is burned with but a limited supply of oxyegn, so that oxide of carbon is produced, which is conducted into a combustion-chamber and there burned with heated atmospheric air, the so-burned gas being employed for heating up the retorts, boilers, or for other purposes. Furnaces of this construction can be run with greater economy of fuel, as a higher degree of temperature and a more perfect combustion of the fuel is secured. Numerous attempts have been made to simplify the construction of these furnaces and to utilize in the most advantageous manner the heat radiated by employing it for heating up the atmospheric air necessary for the combustion of the carbonic-oxide gas. Complicated systems of air-heating flues have been arranged in various relative positions to the generator or to the flues through which the gases of combustion are drawn off to the chimney; but these different constructions were either too complicated and expensive or they had inherent defects, so that they did not fully come up to the practical requirements of the arts.

The object of my invention is to furnish an improved gas-generating furnace for heating benches of gas-retorts, boilers, and for other purposes in the technical arts, in which the generator, the combustion-chamber, the flues for conducting and heating up the atmospheric air, and the flues in which the gases of combustion are drawn off to the chimney are arranged in such compact, economical, and convenient positions relatively to each other that not only the construction of the furnace is simplified and rendered less expensive, but that radiation and loss of heat is to a great extent obviated and the air required for the combustion of the carbonic-oxide gas gradually raised to the same, or nearly the same, temperature as that of the gases of combustion drawn off, so that a more perfect combustion of the oxide of carbon takes place in the combustion-chamber, and consequently a higher percentage of heat is obtained from the fuel.

The invention consists of a gas-generating furnace in which the generator is arranged vertically below the combustion-chamber, a primary series of connected air-flues in each side wall of the generator, which air-flues are connected to a second series of horizontal air-flues interposed between an upper and a lower tier of flues for drawing off the gases of combustion. From the second series of air-flues the air is conducted through a third series of flues arranged in the walls of the combustion-chamber, from which the air is admitted through lateral channels into the combustion-chamber, where it is mingled with carbonic-oxide gas and burned. The hot gases of combustion are then passed around the retorts, drawn in a downward direction, then around the lowermost retorts, forward and back through the upper tier, then down and through the lower tier of flues to the ascending flues leading to the chimney.

Figure 2:
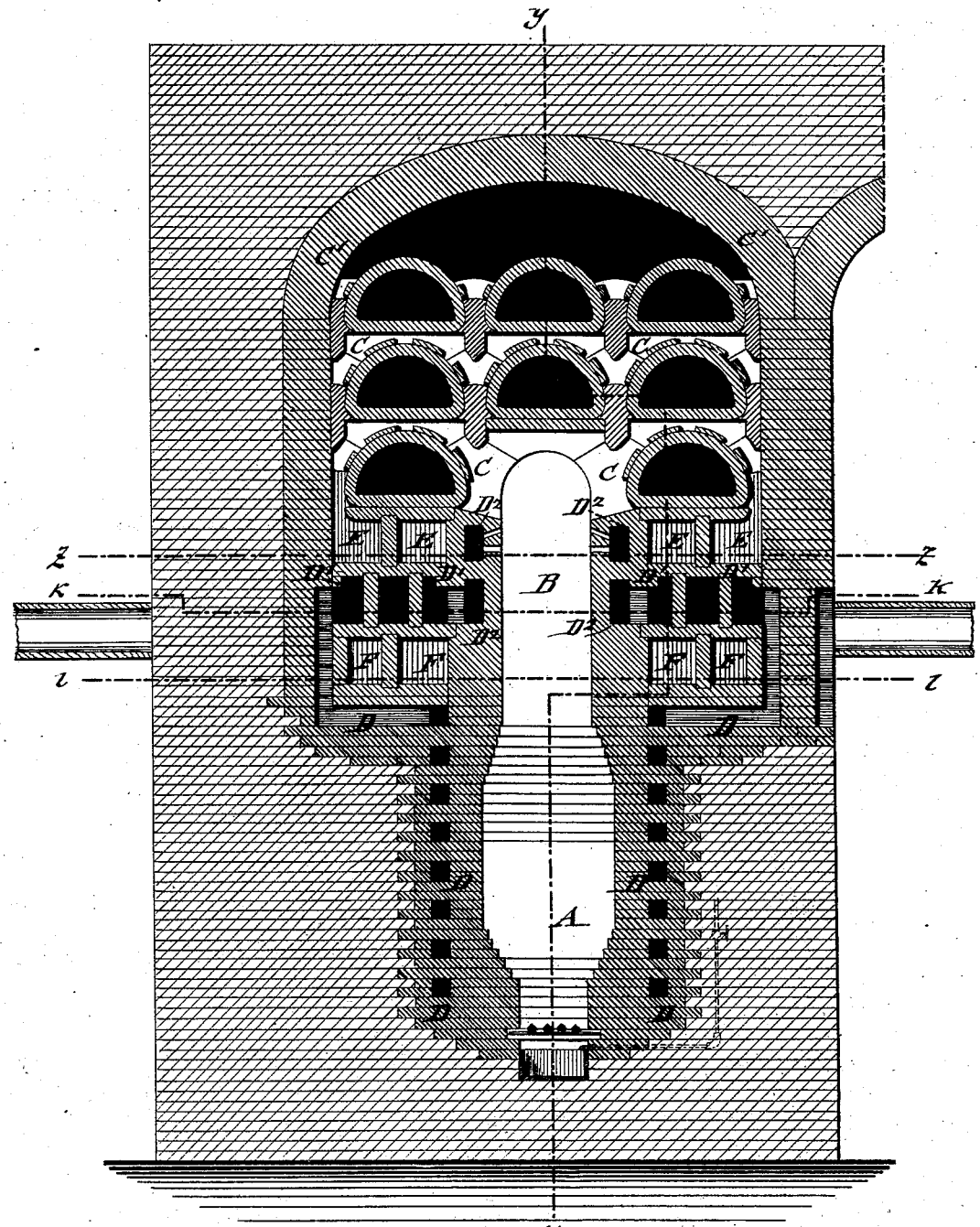
Figure 3:
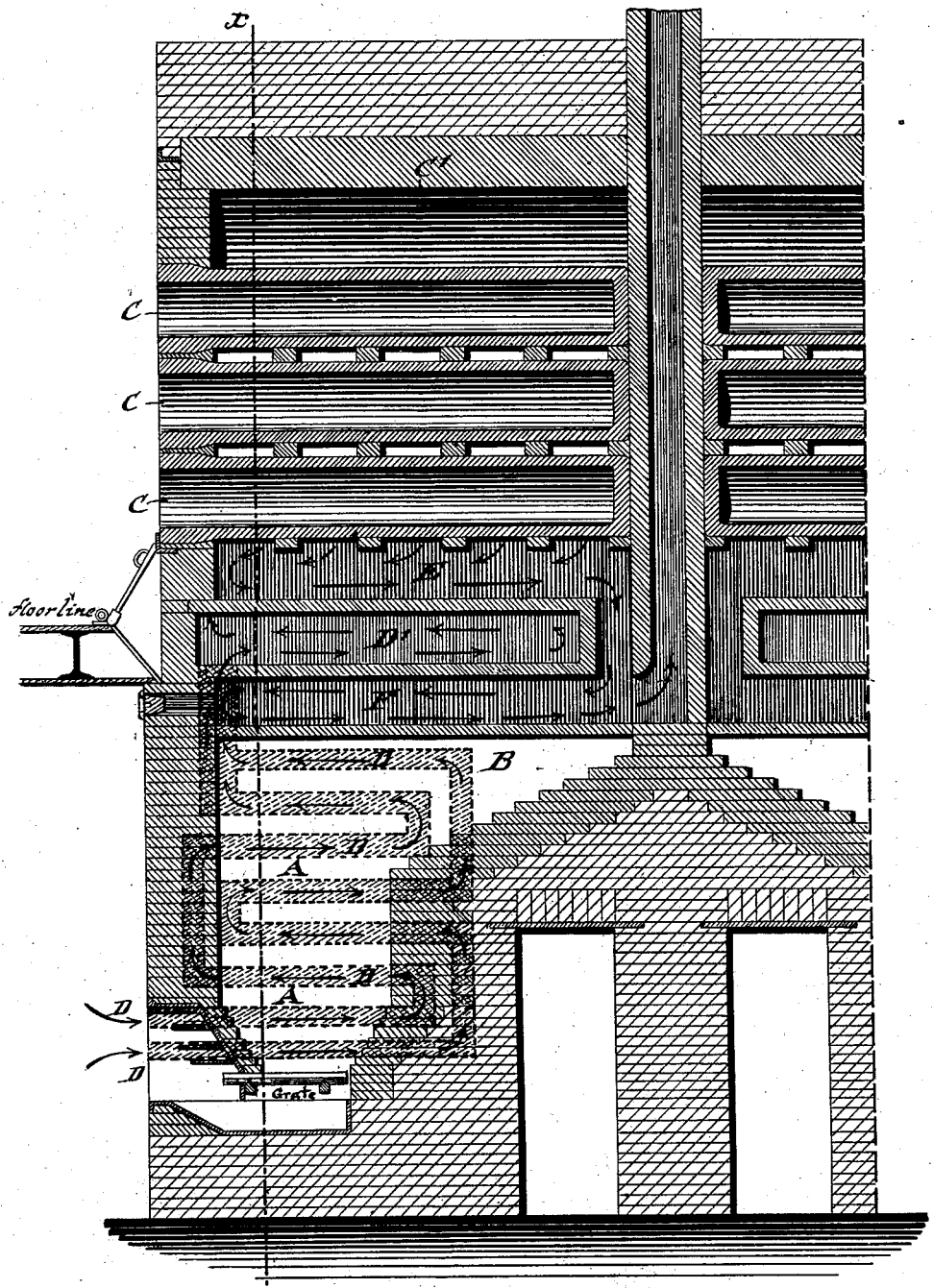
Figure 4:
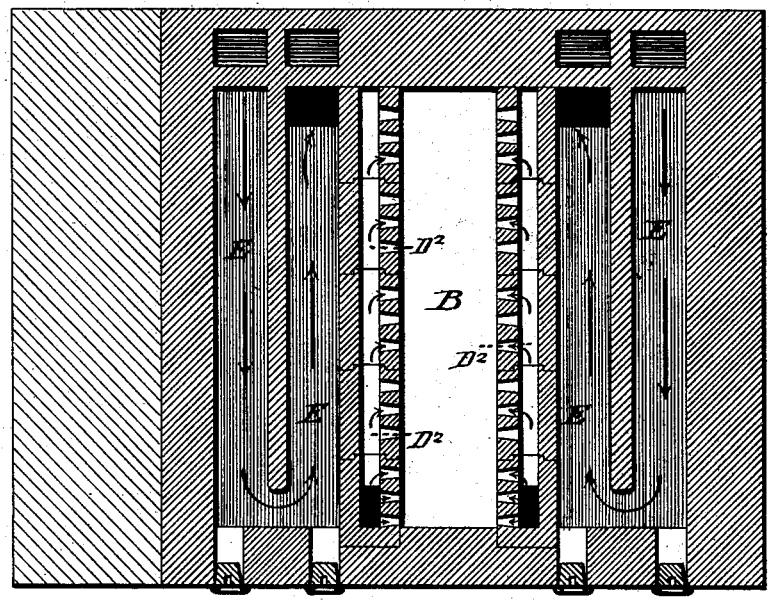
Figure 5:
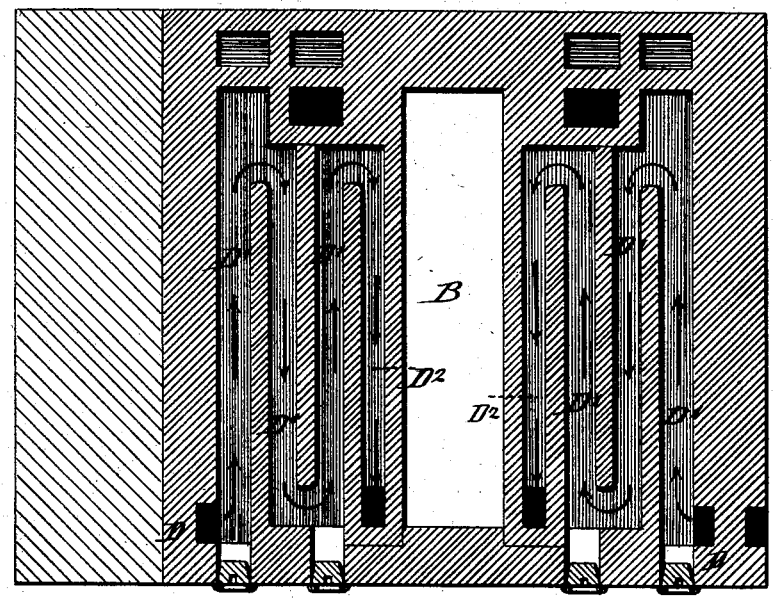
Figure 6:
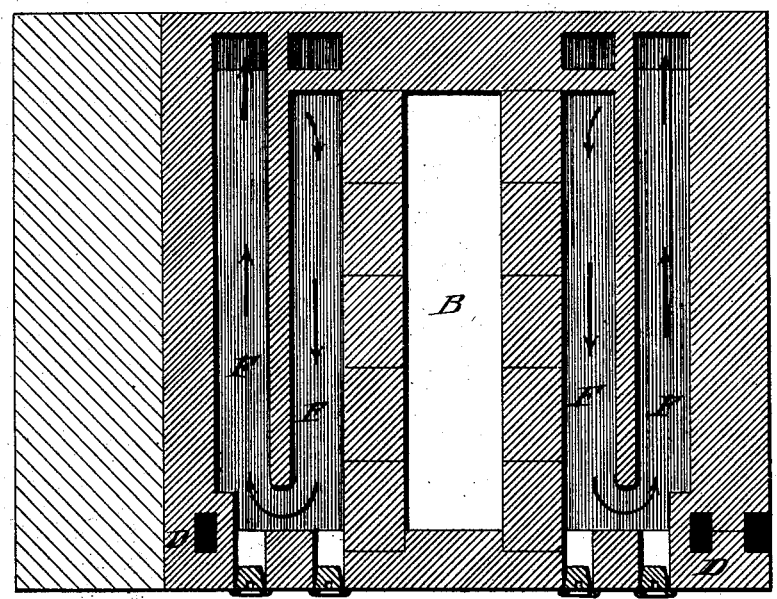

In the accompanying drawings, Figure 1 represents a front elevation of my improved gas-generating furnace. Fig. 2 is a vertical transverse section of the same drawn on line $x\,x$, Fig. 3. Fig. 3 is a vertical longitudinal section drawn on line $y\,y$, Fig. 2, and Figs. 4, 5, and 6 are horizontal sections, respectively, on the lines $z\,z$, $k\,k$, and $l\,l$, Fig. 2.

Similar letters of reference indicate the same parts.

Referring to the drawings, A represents a generator which is arranged vertically below the combustion-chamber B. The middle portion of the generator A is made wider and provided with parallel side walls, while the lower part of the generator is contracted, as shown clearly in Figs. 2 and 3, and provided with a grate of suitable construction and an ash-pit below the grate, to which latter water is supplied. The upper part of the generator A is also contracted in width, but extended toward the rear wall of the bench, so that the carbonic-oxide gas generated therein has a chance to expand and fill up the entire combustion-chamber B.

Above and sidewise of the combustion-chamber are arranged the retorts C, which are supported on saddle and bridge tiles in the usual manner in the retort-chamber C'.

The retorts, flues, and all the parts exposed to the fire are made of fire-brick, as customary in gas-generating furnaces of this class. In each side wall of the generator is arranged a primary series of air-flues, D, into which the air is drawn by openings provided with regulating-slides, said openings being arranged near the lower part of the generator, as shown clearly in Fig. 1. The air-flues D are arranged parallel to each other, but in a vertical plane, at both sides of the generator, so that the air passing through the same is heated up by the heat radiated by the walls of the generator. The primary series of air-flues D is clearly shown in section in Fig. 2 and in dotted lines in Fig. 3. They are connected with a second system of horizontal air-conducting flues, D', which are arranged on or about a level with the lower part of the combustion-chamber B, and interposed between tiers of top and bottom heating-flues, E and F, which serve to take up and conduct the gases of combustion after they have been utilized for heating up the retorts to the chimney. While the air drawn in at the lower part of the generator is heated up to a temperature of about 900° in the primary air-flues D, arranged at both sides of the generator, it is heated up during the passage through the second system of flues D' to a temperature of about 2,000° Fahrenheit. The air is then drawn off into a third series of air-flues, $D^2$, which are arranged in the side walls of the combustion-chamber B, the lower flues $D^2$ being on a level with the series of horizontal air-flues D' and connected thereto, while the upper air-flues $D^2$ are vertically above the lower air-flues $D^2$.

As the greatest heat is generated in the combustion-chamber the last series of air-flues, $D^2$, act in the nature of retorts upon the air passed through the same and raise its temperature to a still higher degree, so that it is delivered through the lateral channels of the upper flues $D^2$ at a temperature of from 2,500° to 2,600° Fahrenheit into the combustion-chamber.

It is preferable to arrange two rows of lateral discharge-channels for the hot air, whereby a more effective intermingling of the oxide of carbon with the hot air takes place, so that the combustion of the gases is confined to the combustion-chamber, and consequently the highest temperature secured therein. The burning gases are drawn in sheets of flame around all the retorts in the retort-chamber, passing through between the saddle-tiles. The heated products of combustion are drawn from the retort-chamber C' in downward direction to the upper tier of heating-flues E, which are arranged immediately below the lowermost retorts, C. They pass in these flues first forward toward the front of the bench, and are then brought back to the rear of the bench, whereby the lowermost retorts, C, are exposed to the heat of the products of combustion from below. The fire-gases are then drawn down through vertical connecting-flues at the rear of the bench into the lower tier of heating-flues F, brought from the rear toward the front, then back again, and are then drawn into the ascending flues leading to the chimney.

The course of the heated air and of the fire-gases through the different tiers of flues is clearly indicated by arrows in Figs. 3, 4, 5, and 6 of the drawings, the air-flues and heating-flues being so arranged throughout that the air and fire-gases move always in opposite directions to each other.

Owing to the arrangement of the air-flues in three different systems, which are arranged one above the other, the air ascends from the lower series of flues into the second series of air-flues arranged between the heating-flues that conduct off the products of combustion, and is then passed into the third series of flues, arranged in the side walls of the combustion-chamber. The air ascends thus naturally from one system of air-flues to the next one above, and is finally thrown at about the same degree of heat as that of the gases of combustion into the combustion-chamber.

As the second series of air-flues and the flues for the gases of combustion are arranged sidewise of the combustion-chamber, the products of combustion are not required to be drawn to any great depth below the floor-line, so that consequently neither an artificial draft nor a very high chimney is necessary. The entire construction of the furnace becomes thereby compact and less expensive, while giving results which fully equal the more expensive structures of this kind heretofore in use.

Having thus described my invention, I claim as new and desire to secure by Letters Patent—

1. The combination of a generator, a combustion-chamber vertically above the generator, a primary series of air-flues arranged in the side walls of the generator, a second series of air-flues arranged in the side walls of the combustion-chamber and connected with the first series of air-flues, a tier of heating-flues arranged in the walls of the combustion-chamber underneath the second series of air-flues, and connected with the combustion-chamber and with the chimney, and a third series of air-flues in the side walls of the combustion-chamber, adjacent to the inner face thereof, said third series being connected with the second series and provided with lateral channels for discharging the heated air into the combustion-chamber, substantially as described.

2. The combination of a generator, a combustion-chamber vertically above the generator, a primary series of air-flues arranged in the side walls of the generator, a second series of air-flues arranged in the side walls of the combustion-chamber and connected with the primary series of air-flues, a tier of heating-flues for the escaping gaseous products of combustion, connected with the combustion-chamber and arranged in the walls thereof over the second series of air-flues, a second tier of heating-flues arranged in the walls of the combustion-chamber, underneath the second series of air-flues, and connected with the said upper tier of heating-flues and with the chimney; and a third series of air-flues arranged in the side walls of the combustion-chamber, said third series being connected with the second series and provided with lateral channels for discharging the heated air into the combustion-chamber, substantially as described.

3. The combination of a gas-generator, a combustion-chamber above the generator, a retort-chamber above the combustion-chamber, a primary series of air-flues in the side walls of the generator, a second series of air-flues in the side walls of the combustion-chamber, connected with the primary series, a third series of air-flues in the side walls of the combustion-chamber, adjacent to the inner face thereof, and connected with said chamber by lateral exit-channels, a tier of heating-flues for the escaping products of combustion over the second series of air-flues, a second tier of heating-flues under the second series of air-flues and connected with the first tier of heating-flues, and flues connecting said heating-flues with the retort-chamber and chimney, substantially as described.

4. The combination of a generator, a combustion-chamber vertically above the generator, a primary series of horizontal air-flues arranged vertically in the side walls of the generator, a second series of horizontal air-flues connected with the first series and arranged horizontally in the side walls of the combustion-chamber, heating-flues for the escaping gaseous products of combustion, adjacent to the second series of air-flues, a third series of horizontal air-flues arranged vertically in the side walls of the combustion-chamber adjacent to the inner face thereof, the lower flue of said third series being connected with the second series of air-flues and the upper flue thereof having lateral exit-channels for discharging the heated air into the combustion-chamber, and flues connecting the heating-flues with the combustion-chamber and chimney, substantially as described.

In testimony that I claim the foregoing as my invention I have signed my name in presence of two subscribing witnesses.

ADAM WEBER.

Witnesses:
  PAUL GOEPEL,
  SIDNEY MANN.